C. K. Marshall,
Defecating Cane Juice.
No. 101,288. Patented Mar. 29, 1870.
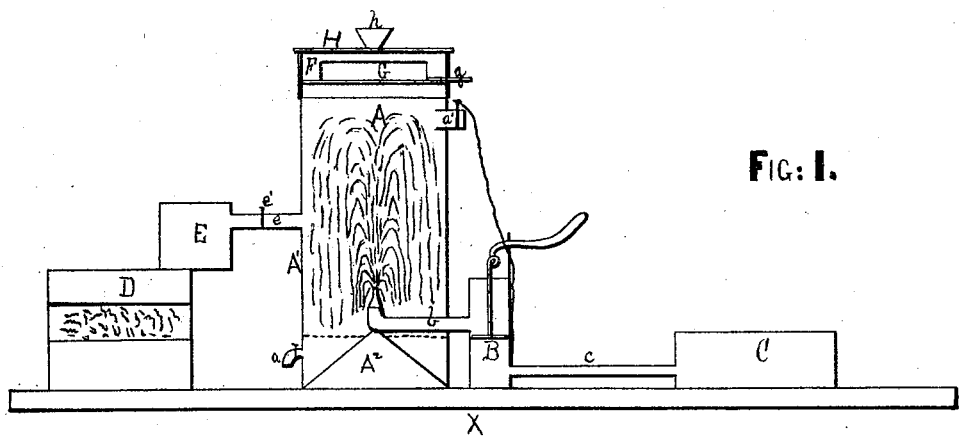
Fig: 1.
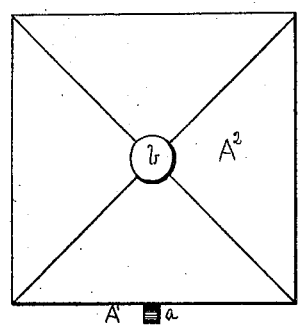
Fig: 2.
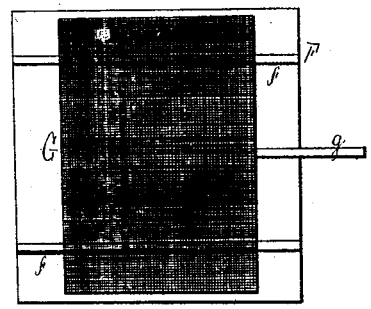
Fig: 3.
WITNESSES.
Edwin James.
Alf. Holmead Jr
INVENTOR.
C. K. Marshall.
per J. E. J. Holmead,
Attorney.

United States Patent Office.

C. K. MARSHALL, OF NEW ORLEANS, LOUISIANA.

Letters Patent No. 101,288, dated March 29, 1870; antedated March 15, 1870.

IMPROVED APPARATUS FOR DEFECATING CANE-JUICE.

The Schedule referred to in these Letters Patent and making part of the same.

*To all whom it may concern:*

Be it known that I, C. K. MARSHALL, of New Orleans, in the parish of Orleans and State of Louisiana, have invented certain new and useful Improvements in Apparatus for Defecating Juices and other liquids, and bleaching sugar, farinaceous and other substances, by the use of sulphurous-acid gas; and I do hereby declare that the following is a full, clear, and exact description of the same, reference being had to the accompanying drawing and to the letters of reference marked thereon, making part of this specification, in which—

Figure 1 is a horizontal sectional view.
Figure 2 is a view of the bottom.
Figure 3 is a view of the sieve or bolter.

The object of my invention is to provide an appatus for defecating saccharine juices and other liquids, and bleaching sugar, farinaceous and other substances, by the use of sulphurous-acid gas, by an entirely new and improved method.

I am well aware that many attempts have been made to so apply the gas or fumes of sulphurous acid to cane-juice and other liquids, that the same would be clarified, or, as is known to the trade, "defecated" by the action of the acid. But the great difficulty met with in all the plans heretofore essayed is that the gas is not permitted to so thoroughly commingle with the liquid as to subject the entire mass to its direct action. Revolving troughs, perforated tubes and plates, cylinders and other like devices I know have been used for the purpose of attempting to so break the flow of liquid that some separation of the particles which compose the same should take place while it was being subjected to the action of the gas. These devices referred to, however, have only lessened the difficulties and evils which arise from being compelled to pour, as it were, a continuous and compact stream of liquid into a vessel filled with gas, but they have not removed the same, and practical experience has fully attested the fact that no amount of stirring or agitation of the mass of liquid, as a mass, will produce such positive disintegration as will insure that each and every particle shall be alike subjected to the direct action of the gas. Now, this complete disintegration of the liquid, which is so essential, cannot be effected if the same is poured, it matters not how complete the apparatus may be, or how small the stream it allows to fall. The reason of this is plain, as will readily be seen by a moment's reflection. The cane is crushed, and as its juice passes off to the vat or other vessel, it necessarily carries with it minute particles of cane and other impurities. Now, when this juice is pumped or otherwise conveyed to the vessel containing the gas, the lees or dregs and sediment are carried with it. These are most glutinous, and naturally adhere together, and, when the juice is poured, form a kind of incrustation around the outer surface of the same. It is true, the coating thus produced is exceedingly thin, and, at times, almost imperceptible, but it prevents the gas from thoroughly entering and acting directly on each and every divided particle. This same difficulty is also met with in greater or lesser degree in all other liquids.

By my process, all these difficulties hereinbefore referred to are entirely avoided. The disintegration of the mass and its separation into a spray or mist-like form are secured, which, first ascending and then descending through a column or vessel thoroughly charged with gas, will insure that each and every particle, no matter how minute the same may be, will be acted upon directly by the gas. Thus, a thorough and complete permeation of the entire mass is accomplished.

My invention consists in introducing into a column or other suitable vessel charged with sulphurous-acid gas, by upward pressure, a continuous stream of cane-juice or other like liquid. The pressure may be applied by a steam-pump or other like means, and the dimensions of the column may be such as experience may suggest as most desirable, care being taken that its height is such that, as the column of juice or liquid descends, it shall be thoroughly broken, falling in as fine particles as are usually designated as spray or mist.

The apparatus I use is simple and practical, and can be constructed at a moderate cost. It consists of a column or upright cylinder, which is supplied with the sulphurous-acid gas by means of a pipe communicating with the purifier or other vessel containing the gas. The liquid is conveyed from the vat to the base of the pump, or a vessel in which the pump is seated, by means of a pipe, and then, through a suitable pipe, is forced in an upright column, under heavy pressure, into the cylinder charged with the gas. The pressure with which the liquid is thus driven will depend in some degree on the height of the cylinder, as it is desirable that before the liquid reaches the top of the same its column shall be broken and begin to descend.

Thus, it will be observed that, independent of the great advantage of having the liquid passed in a fine spray through the gas, my process also causes the liquid to be subjected to the double action of the gas by a single operation, it passing through the same both as it ascends and descends.

My apparatus is also admirably adapted to the clarifying or defecating of sugar and other like substances. When intended to be thus used, I secure at the top of the column or upright cylinder an open box, which closely fits the upper section of the cylinder. Across this box run suitable bearing-rods for the sieve or bolter to rest and work on. Through the top of this box passes a funnel, by means of which the sugar or other like material is fed to the sieve.

The column being thoroughly charged with gas, and a rapid oscillating motion being imparted to the sieve or bolter by any suitable means, the sugar or other material, in a fine pulverized powder, is caused to be sifted into the gas, and, falling directly through the same, is necessarily subjected to its direct action, as will be more fully stated hereafter.

To enable others skilled in the art to make and use my invention, I will now proceed to describe its construction and operation.

A is the column or upright cylinder, and may be made of any material suited to the purpose for which it is designed.

This column A is permanently secured to a platform or floor, X, and may be of any desired form and height. I usually construct it square, and varying from ten to thirty feet in height. I may here remark, however, that its height will measurably depend on the degree of pressure under which the juice or other liquid is to be introduced, as it is desirable that the column of juice or other liquid should be allowed to reach its utmost altitude without obstruction, so that its separation and fall may be natural, and exactly like that of the upright jet of a fountain, each and every particle entirely independent.

This column A must be perfectly air-tight, so as to prevent the escape of the gas, and is therefore provided with a closely-fitting top and bottom. I usually construct the latter in a square, angularly cone form.

To one of the sides, A', I secure the pipe $a$, by means of which the juice or other liquid is drawn off after being subjected to the action of the gas.

B is a pump, and is intended generally to be worked by steam.

This pump B, or the tub or vessel in which it is to be seated, is fed with a continuous supply of juice or other liquid from the vat C, by means of the pipe $c$.

The liquid, thus supplied by means of the pump B, is conveyed to the cylinder A, and discharged in an upright column therein by means of the pipe $b$.

D is a suitable retort or other vessel, for burning the sulphur, the gas or fumes of which, ascending, enter the vessel E, which may be used as a purifier, or the gas may be carried from thence to a vessel or purifier filled with water.

There is nothing at all new in the arrangement of either my furnace, retort, or purifier.

When the vessel E is used as the purifier, the gas is conveyed from thence to the cylinder A by means of a pipe, $e$.

Having described the devices used in defecating liquids, I will now describe their operation.

The sulphur is placed in the retort D, and subjected to heat in the usual manner. As the gas is generated it passes off into the vessel or purifier E, from whence, by turning the cock or key $e'$, it will pass through the pipe $e$ into the upright cylinder A. The vat C is kept constantly supplied with juice or other liquid. From this vat C, through the pipe $c$, a continuous stream of juice or other liquid is conveyed to the pump B, or the tub or vessel in which the pump is seated. The vessel A being properly charged with gas, the pump B is operated, and the juice or other liquid is forced through the pipe $b$, in an upward stream, into the cylinder A. The column of liquid, breaking, falls and descends as hereinbefore described, falling on the bottom $A^2$, from which it is drawn off by means of the pipe $a$.

Some liquids will be more easily worked by being slightly heated. This can readily be done by simply placing a furnace with a slow fire under the vat C; the vat of course, in which case, will be composed of such material as not to be affected by the action of the heat.

Of course the apparatus herein described may be varied in form as well as in arrangement without affecting in the slightest degree either the object of my invention, or the principle in which the same is developed. For instance, instead of the pump herein described, any other well-known means of obtaining such pressure may be applied.

When the apparatus is intended to be used for clarifying or defecating sugar, or bleaching farinaceous substances, a slight alteration in the same is necessary.

To the upper section of the cylinder A, I apply the box-frame F. This frame F fits closely, and thus forms a perfectly tight joint with the cylinder.

In the frame F are two or more bearing-rods $ff$, on which rests and works the sieve or bolter G.

This sieve or bolter G is provided with a handle, $g$, protruding through one of the sides of the box F, and by means of which it can conveniently be connected to and operated by suitable machinery. The steam-power used to drive the pump may be applied for this purpose, especially as the pump is dispensed with when the apparatus is designed for sugar and farinaceous substances.

The box-frame F is provided with a flanged top, H, through the center of which passes a funnel, $h$, by means of which the substance to be acted on is fed to the sieve G, which is to be oscillated in the most rapid manner, and from thence passed down through the gas in the cylinder A, the latter being charged with gas precisely in the same manner as when it is to be used for defecating liquids, the gas passing off by means of the escape-valve $a'$.

The sugar or farinaceous matter may be conveyed to the funnel by any desired method. The ordinary grain-elevator used in mills is well adapted to the purpose.

It will be observed that, owing to the rapid motion imparted to the sieve, the substance will be thoroughly sifted, and descend through the gas in a fine pulverized powder.

Having thus fully described my invention,

What I claim therein as new, and desire to secure by Letters Patent of the United States, is—

1. Introducing cane-juice or other liquid into a stationary column or upright cylinder charged with sulphurous-acid gas, by means of upward pressure, when the same is so arranged that the liquid shall descend through the gas in the form of fine spray, substantially as described.

2. Forcing the liquid into the stationary cylinder A, when the same is charged with sulphurous-acid gas, by means of a force-pump, B, or equivalent device, substantially as described.

3. The sieve G, when the latter is so arranged in a frame as to freely oscillate therein, whereby sugar or farinaceous substances can be so sifted as to be discharged in a pulverized powder in the stationary cylinder A charged with sulphurous-acid gas, the whole being so combined and arranged as to operate substantially as described.

In testimony whereof I have signed my name to this specification in the presence of two subscribing witnesses.

C. K. MARSHALL.

Witnesses:
 EDWIN JAMES,
 FRED. KOONES.